United States Patent [19]
Leitner

[11] 3,864,789
[45] Feb. 11, 1975

[54] SPRING CLIPS

[76] Inventor: Kajetan Leitner, Winacker, 8177 Bad Tölz, Bavaria, Germany

[22] Filed: June 19, 1973

[21] Appl. No.: 371,344

[30] Foreign Application Priority Data
June 21, 1972  Germany............................ 2230309
Nov. 28, 1972  Germany............................ 2258213
Feb. 23, 1973  Germany............................ 2309144

[52] U.S. Cl. .............................. 24/73 MF, 52/718
[51] Int. Cl. ..................... A44b 21/00, A44b 19/06
[58] Field of Search ........ 52/716, 717, 718; 85/5 R; 24/73 FT, 73 RM, 73 SA, 73 SM, 214, 259 FS, 259 TF, 213 B, 213 R, 73 B, 73 MF, 81 B, 81 BM

[56] References Cited
UNITED STATES PATENTS
2,154,712  4/1939   Van Uum............................. 85/5 R
2,368,027  1/1945   Johnson ............................. 24/73 B
2,596,780  5/1952   Meyers et al. ........................ 85/5 R
2,692,414  10/1954  Poupitch ........................... 24/73 MF
2,754,561  7/1956   Bedford............................. 24/213 B FOREIGN PATENTS OR APPLICATIONS
241,273    10/1962  Canada.............................. 52/718
1,413,744  8/1965   France ............................. 24/73 FT
476,990    12/1937  Great Britain ................... 24/73 MF Primary Examiner—Donald A. Griffin
Attorney, Agent, or Firm—Anthony A. O'Brien

[57] ABSTRACT

A spring clip for attaching a decorative or other strip to an automobile includes an integral pair of spring arms extending outwardly from a U-shaped eye the legs of the eye having spring bracing lugs to grip the border of a wall aperture in opposition to the spring arms gripping over flanges of the strip.

4 Claims, 12 Drawing Figures

SPRING CLIPS

This invention relates to spring clips and its main object is to provide attachment clips by which decorative, trimming or protective strips can be secured to the body walls or like parts of automobiles.

Many kinds of such clips are known and usually a strip complete with several clips is pressed into position so that the clips project through apertures provided for them in the automobile wall. If heavy strips such as collinsion strips are so mounted, considerable pressure must be applied, such as by hammering to force the strips into place.

One object of the present invention is to provide a clip which can be applied without great pressure being required during installation of the strip.

Further objects of the invention include the construction of rattle-free clips and clips which will engage not only in a T-section slot of a strip but also corresponding flanges of a strip insert.

The invention as applied to a spring clip includes an integral pair of spring arms which extend outwardly from a U-shaped eye, formed by a bend between parallel legs, so that the arms can grip over opposed flanges of a strip to be attached to a wall by the eye engaging through an aperture in the wall.

According to the invention, the legs practically touch one another as they diverge from the eye, so as to oppose flattening of the eye, and the sides of the eye have outwardly divergent spring bracing lugs which will deflect into permit the eye to enter a wall aperture, and spring apart to grip the border of the wall aperture in opposition to the spring arms which grip the strip flanges.

It can be shown that the effect of the two legs practically touching is that, as the eye is passing through a wall aperture, the legs actually abut and maintain the open shape of the eye, against the action of the inward deflection of the spring bracing lugs passing through the aperture.

Preferably the clip is formed from sheet metal and, because only the spring bracing lugs and not the clip as a whole need deflect when inserted through an aperture, relatively thick sheet metal can be used. For example spring steel of 0.5 to 1.0 mm thickness gives good strength and rigidity to the clip.

Also, with a sheet metal clip, the spring bracing lugs may be stamped and bent out from the legs of the eye, so that they diverge from the rounded end of the eye. The lugs are tapered so that they have a clearance gap permitting their deflection into the eye without fouling the edge of the leg from which they are stamped.

The lugs may be stamped out of a middle portion or from opposite corners of the legs of the eye and may diverge way from the leg part way along the length thereof.

The ends of the spring arms and of the lugs may be bowed or rolled inwardly to provide improved pressure surfaces.

The spring arms may be wider than the sides of the eye, so that the clip has an enlarged head for engagement with the attached strip.

Further, in a modified embodiment, secondary spring arms, to grip under the strip flanges, may be stamped and bent downwardly from the main spring arms. Anti-rotation abutments may be similarly formed on opposite edges of the spring arms so that the clip may engage the flanges of the strip by insertion and partial relative rotation, the spring arms passing to pass between the flanges.

To use the clips in accordance with the invention, a strip to be attached to a wall is first provided with a suitable number of clips, spaced apart as required. The clips may engage the strip with their spring arms received in a T-section slot of the strip, from an open end or slot or enlargement, or by other appropriate engagement with the T-section or other opposed flanges. Clips may engage elongated flanged holes in a strip.

The eyes of the clips are then presented to the apertures in the wall and pressed or pulled through the apertures until the spring bracing lugs deflect inwardly after which they spring out to grip behind the borders of the apertures.

An important advantage of the invention is that, where access is available behind a wall, such as before internal trimming or lining is installed in an automobile, the clips can be pulled through their apertures, by means of a suitable lever or other tool engaging the clip eyes, so that excessive external pressure or hammering is not required.

Also, since the clips engage only a T-section slot or flanges of a strip, the outer side of a strip may be of any required construction or shape. For example a rubber-faced collision strip may have a rubber or other facing which is continuous, without interference from the clips.

The above and other features of the invention are illustrated, by way of example, on the accompanying drawings, in which.

Figure 1:
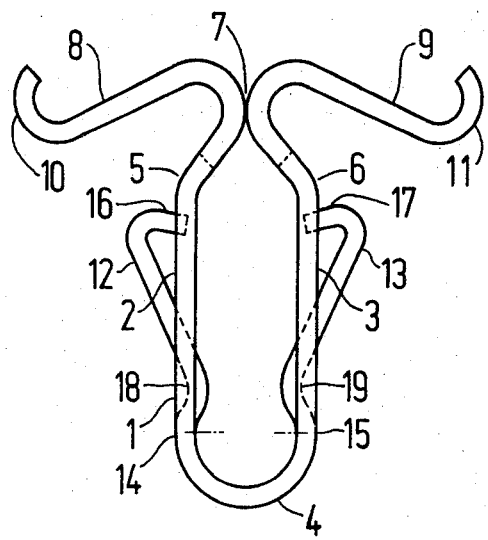
FIG. 1 is a side view of a slip according to one embodiment of the invention.
Figure 2:
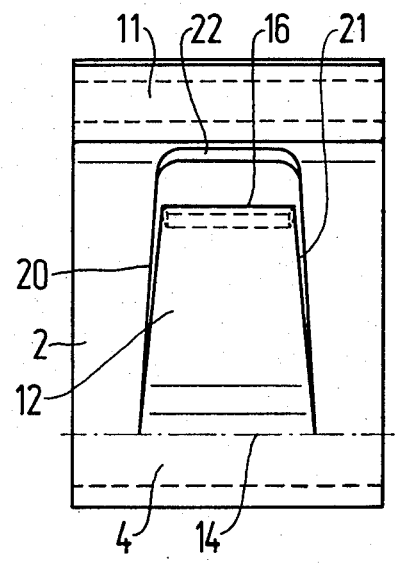
FIG. 2 is a face view, at 90° from FIG. 1, of the clip of FIG. 1.
Figure 4:
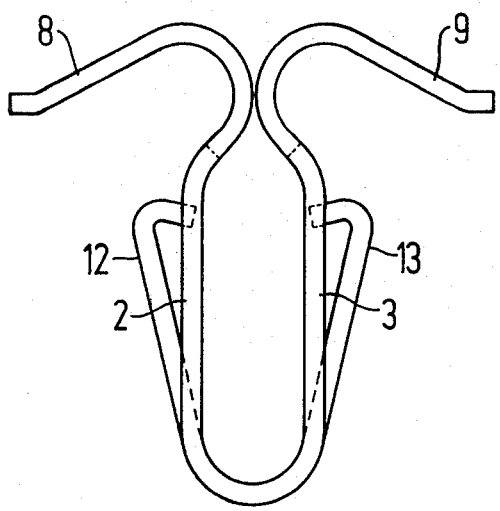
Figure 5:
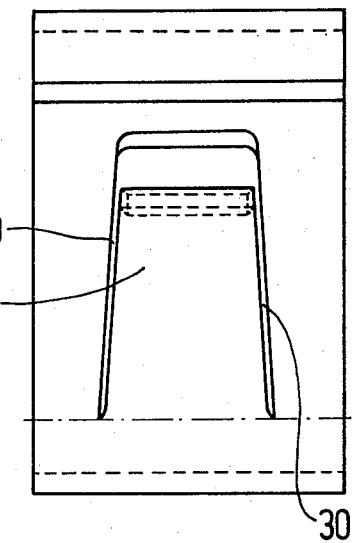
Figure 6:
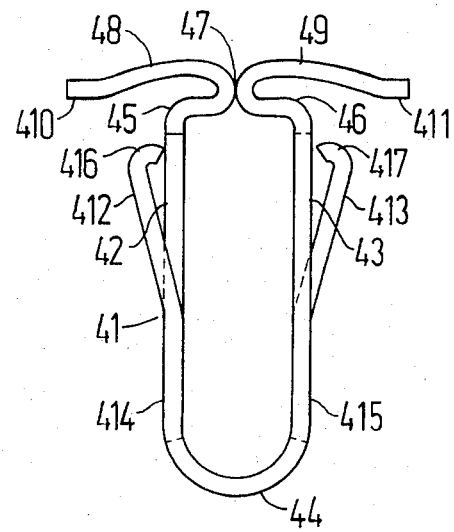
Figure 7:
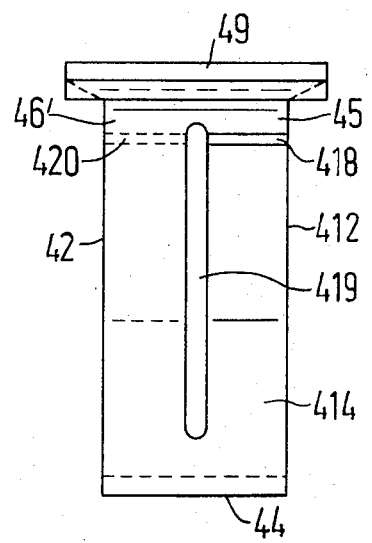
Figure 8:
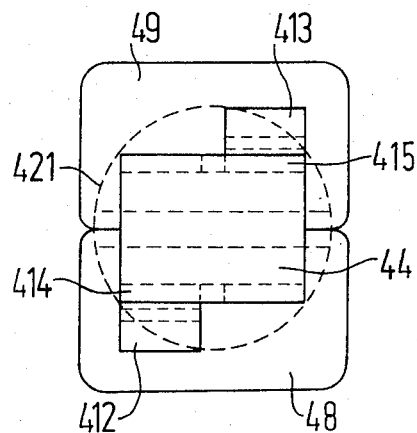

FIGS. 4 and 5 are views, similar to FIGS. 1 and 2, of an alternative embodiment of the invention FIGS. 6 and 7 are views, similar to FIGS. 1 and 2, of a further embodiment of the invention, FIG. 8 is an inverted plan view of the clip of FIG. 6, showing the eye part of the clip.

Figure 9:
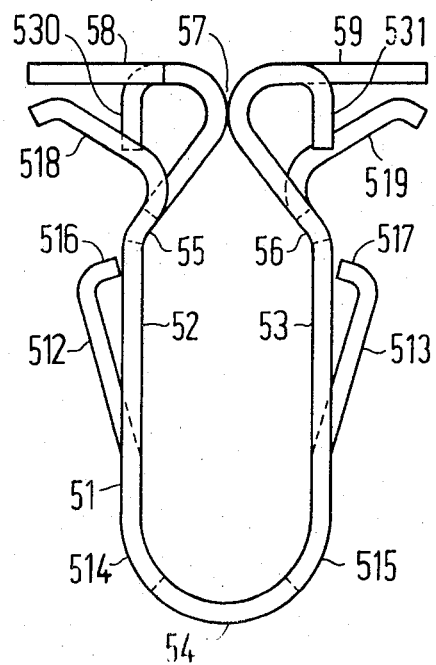
Figure 10:
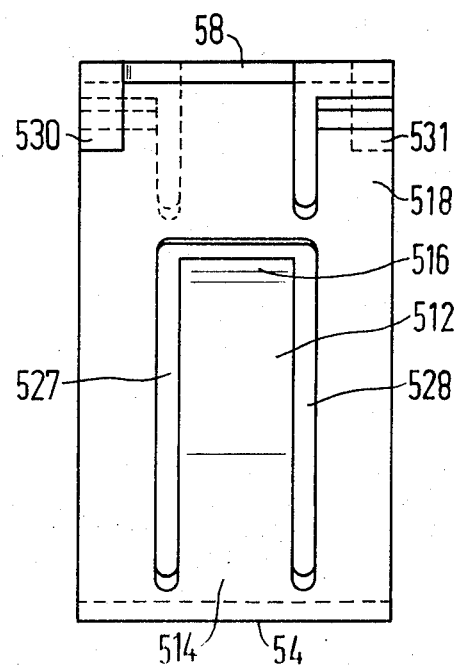
Figure 11:
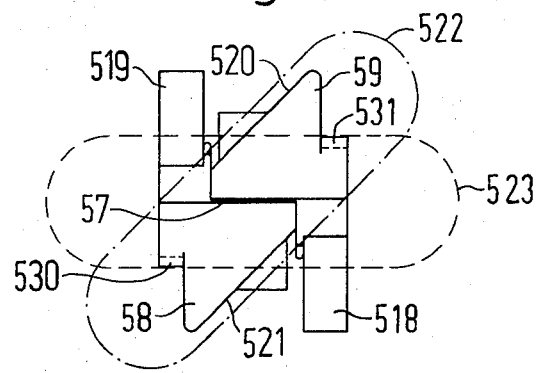
Figure 12:
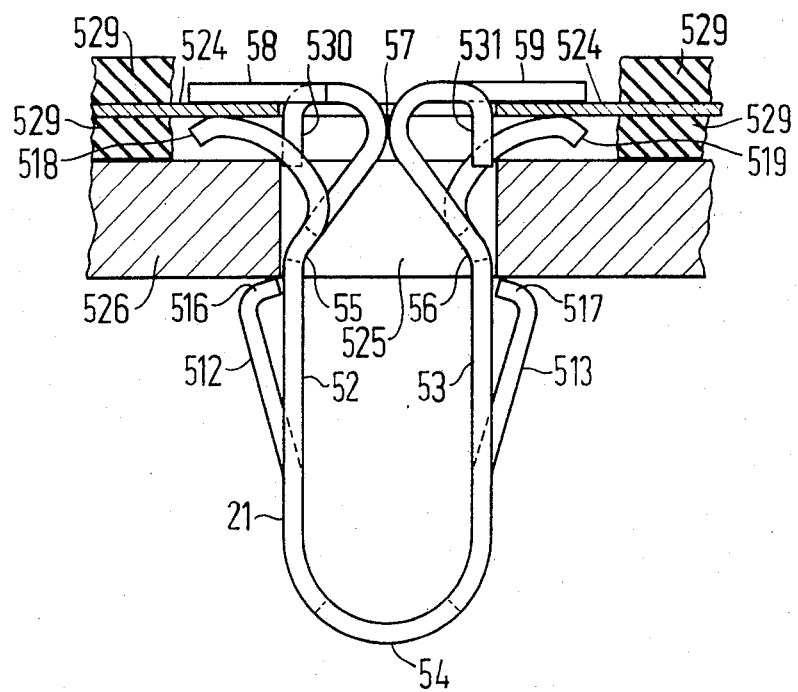

FIGS. 9 and 10 are views, similar to FIGS. 1 and 2, of another modified embodiment, FIG. 11 is a plan view of the clip of FIG. 9, showing how the clip is inserted in an elongated hole indicated in dash-dot and broken lines, and FIG. 12 shows the clip of FIGS. 9 to 11 in use.

The attachment clip shown in FIG. 1 has a U-shaped eye 1 having two parallel side legs 2 and 3, connected by a curved part 4. The legs 2 and 3 are bent symmetrically inward at 5 and 6 towards a point 7 at which the legs practically touch and from which they diverge outwardly and apart into spring arms 8 and 9 having rolled-in ends 10 and 11. The result of bending together the legs 2 and 3 of the eye 1 at 5 and 6 to meet at 7 is that the legs 2 and 3 cannot practically be closed together and will retain their parallel relationship defining the eye 1. It is not necessary for actual contact to take place at 7; instead, it is sufficient if a very small gap exists there.

Stamped out of the legs 2 and 3 are outwardly projecting resilient bracing lugs 12 and 13 which, in the region of the curved part 4 of the eye 1, merge into the curvature, so forming spring zones 14 and 15. At their ends, the bracing lugs 12 and 13 are bent in and back to form pressure surfaces 16 and 17. The bracing lugs 12 and 13, before their transition into the curved part 4, in other words before the spring zones 14 and 15, have bent-in parts 18 and 19, the function of which will be dealt with in greater detail in the description of FIG. 2.

Figure 3:
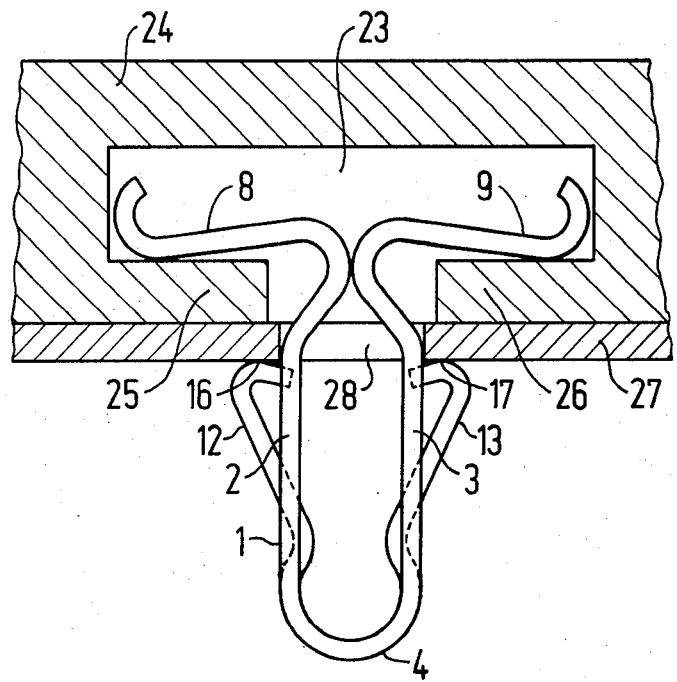
FIG. 3 shows the clip of FIG. 1 in a installation.

In order to fit the described clip to a wall together with its attached strip the eye 1 of the attachment clip is passed through a suitably shaped aperture in the wall, the bracing lugs 12 and 13 being pressed inwardly, but returning to their spread apart state again after they have been inserted (see FIG. 3). So that the bracing lugs 12 and 13 have the greatest mobility, a gap is left between them and the legs 2 and 3 so that the bracing lugs 12 and 13 cannot become hooked onto the legs either during insertion of the clip or during removal.

The formation of this gap can be best seen in FIG. 2. This drawing shows the attachment clip of FIG. 1 in a position rotated 90°. As can be seen, stamped out of the leg 2 is the bracing lug 12 which merges into the curved part 4 in the area of the spring zone 14. At the end of the bracing lug 12 is the pressure surface 16. The bracing lug 12 is tapered so that it narrows in the direction of the pressure surface 16, the hole stamped in the leg 2 being of the same tapered shape. Since, the bracing lug 12 (and correspondingly the bracing lug 13) prior to its merging into the curved part 4, has a bent-in part 18, the bracing lug 12 seems to a certain extent to be pulled back into itself, it's tapered form leaving a divergent slot 20 and 21 on each of its sides. Between the bracing lug 12 and an oppositely disposed stamped edge 22 in the leg 2 there is a larger gap, created by the formation of the pressure surface 16. The bracing lug 12 can thus easily spring to and fro in its stamped-out hole without being held fast by the hole.

In FIG. 3, the attachment clip shown in FIGS. 1 and 2 is shown in the installed position. As can be seen, a spring arms 8 and 9 are accommodated in the T-shaped recess 23 in a strip 24 and the spring arms 8 and 9 press under tension against the inwardly directed flanges or webs 25 and 26 of the strip 24. Beneath the strip 24 is a sheet-metal wall 27 having an aperture 28 of rectangular form and dimensions corresponding to the cross-section of the attachment clip which into the aperture 28. To insert the attachment clip, the curved part 4 of the clip is introduced through the aperture 28 until the edges of the aperture 28 bear against the bracing lugs 12 and 13. A pulling tool is used to exert force on the curved part 4 to pull th eye 1 farther through the aperture 28, the bracing lugs 12 and 13 being bent resiliently inwards. Upon reaching the position shown in FIG. 3, the bracing lugs 12 and 13 then spring back and assume their original positions.

When in the position shown in FIG. 3, the attachment clip holds the strip 24 firmly against the wall 27 by the opposed bias of the spring arms 8 and 9, bearing on the flanges 25 and 26, and the pressure surfaces 16 and 17 of the lugs 12 and 13 bearing on the border of the aperture 28. The attachment clip is secured with spring tension and thereby ensures rattle-free attachment of the strip 24 against the wall 27. It is also possible to remove the strip 24 from the wall 27, this only requiring the bracing lugs 12 and 13 to be pressed into the legs 2 and 3 by a pair of pliers, so that the eye 1 can be withdrawn through the aperture 28.

The use of the abutment surfaces 16 and 17 on the bracing lugs 12 and 13 avoids an abutment which would damage the surface of the wall 27. If the bracing lugs 12 and 13 merely ran straight out from the legs 2 and 3, then their ends would press directly against the surface of the wall 27 thereby scraping it and resulting in damage to the wall which would allow corrosion to set in.

FIG. 4 shows an alternative embodiment in which the spring arms 8 and 9 extend out virtually straight. Here there are no rolled-in ends 10 and 11 as in FIG. 1. This embodiment is desirable if the T-shaped recess in the strip is particularly narrow. Also, the embodiment shown in FIG. 4 does not have the bent-in parts 18 and 19 of FIG. 1. To form the gaps between the bracing lugs 12 and 13 and the legs 2 and 3, an appropriate stamping tool is used in this case which stamps out the gaps at the same time as the bracing legs. In FIG. 5, these gaps 29 and 30 are shown. In this embodiment, it would not be necessary either to have the bracing lugs 12 and 13 taper.

As in the case of the embodiment shown in FIG. 1 the legs 2 and 3 are parallel and cannot be pressed closer together, except by great force, since the legs 2 and 3 meet at the point of contact (see FIG. 1) or come very close to each other at this point. When inserted (see FIG. 3), the legs 2 and 3 fully fill out the aperture 28 in the wall 27, so that the eye 1 cannot move laterally within the aperture 28.

The clip illustrated in FIGS. 6 and 7 has a U-shaped eye 41 with two legs 42 and 43 and a curved part 44 connecting the two legs 42 and 43. The two legs 43 and 42 extend away from the curved part 44 in parallel until they are bent inwards symmetrically at 45 and 46. The bent-in parts extend to a contact point 47 from which extend spring arms 48 and 49 which are spread outwardly apart. At their respective ends, the spring arms 48 and 49 have slightly backwardly bent bearing points 410 and 411.

Stamped out from the legs 43 and 44 are outwardly diverging resilient bracing lugs 412 and 413 which, at the curved part 44, merge into the eye 41 forming respective spring zones 414 and 415. The ends of the bracing lugs are bent in, forming pressure or bearing surfaces 416 and 417 which are disposed opposite the bearing points 410 and 411.

Each of the legs 42 and 43 are separated from it's bracing lug 412 and 413 by a medial gap 419, the two bracing lugs 412 and 413 arranged diagonally with respect to each other and with respect to the longitudinal axis of the eye 41.

In FIG. 8, which shows the clip as seen looking towards the curved part 44 of the eye, the broken line shows the edge 421 of a circular aperture in a wall through which the clip could be passed. The drawing shows that the diagonally opposite bracing lugs 412 and 413 of the clip 41 have their outer parts projecting beyond the circular aperture. If the bracing lugs 412 and 413 were positioned in the middle of the eye, it would be difficult to achieve a reliable support because a circular aperture had a greater clearance around the eye and the supporting lugs would thus need to be spread farther apart to guarantee a reliable hold. This might well adversely affect the stability of the bracing lugs. The same reliable grip by marginally situated bracing lugs 412 and 413 can be achieved if, instead of the diagonally disposed bracing lugs 412 and 413, two outwardly disposed bracing lugs were provided per leg.

So that the clip can be reliably held by the inside face of an aperture, it is expedient to provide portions 418 and 420 across the arms 42 and 43 and located opposite the pressure surfaces 416 and 417 in such a way that, when the clip is inserted in the aperture the portions 418 and 420, extending from the bent-in parts 45 and 46, project into the aperture in the wall. The portions 418 and 420 form outer corners for engaging the inside face of the aperture, thus keeping the eye securely centered in the aperture.

If the clip is to be inserted in a relatively narrow aperture, then this must be taken into account in the dimensions of the eye 41. It could occur that the bearing points 410 and 411 of the spring arms 48 and 49 would no longer have sufficient area to ensure stability so that it would be necessary for the spring arms 48 and 49 to be widened beyond the legs 42 and 43, the widened parts, viewed from the spring arms 48 and 49, ending just before the aperture. Thus, during insertion of the clip into an aperture, the widened parts would not impede passage. The widening of the spring arms 48 and 49 is shown clearly in FIG. 7. The widened spring arms also have the advantage of a better grip if the strip which is to be secured has a longitudinally extending recess.

The attachment clip shown in FIG. 9 has a U-shaped eye 51 with two legs 52 and 53 and a curved part 54 connecting the two legs 52 and 53. The two legs 52 and 53 extend from the curved part 54 in parallel, and are bent inwards symmetrically at 55 and 56. The bent-in parts then extend to a contact point 57 from which spring arms 58 and 59 are spread outward and apart. Because the legs 52 and 53 of the eye 51 are close together at 57, the legs 52 and 53 cannot practically be bent together and will therefore remain in their parallel position. It is not necessary that contact actually be made at 57; instead it is sufficient if there is a very small gap left there.

Stamped out of the legs 52 and 53 are there outwardly projecting bracing lugs 512 and 513 which in the region of the curved part 54 of the eye 51 merge into this part to form spring zones 514 and 515. The bracing lugs 512 and 513 are bent in at their ends to form pressure surfaces 516 and 517 which are disposed opposite the spring arms 58 and 59 and extend obliquely inwards towards the spring arms 58 and 59. Thus, the supporting surfaces 516 and 517 are oblique to the longitudinal axis of the clip and, depending on the separation of the bracing lugs 512 and 513, a variable gap is produced between the pressure surfaces 516 and 517 and the spring arms 58 and 59. In this way it is possible to compensate for tolerances with respect to the thickness of the parts to be attached.

As already mentioned, the attachment clip can serve to secure a strip insert to a wall having an elongated hole. For this purpose, diagonally opposite secondary spring arms 518 and 519 are stamped out from the main spring arms 58 and 59. These secondary arms 518 and 519 leave between them and the spring arms 58 and 59 an intermediate space in which the respective flanges of a strip insert can be securely gripped.

To facilitate insertion of the attachment clip into an elongated hole in a strip insert, the spring arms 58 and 59 have at their ends parallel oblique edges 520 and 521. By virtue of these oblique edges the attachment clip, as shown in the plan view of FIG. 11, has a width represented by the shortest distance between the oblique parts 520 and 521 and this width can be passed through the elongated hole. In FIG. 11, the elongated hole is shown in the position in which the attachment clip is inserted through it, the hole being shown by dash-dotted lines and designated by reference numeral 522. The attachment clip is inserted so that its spring arms 58 and 59 pass through the elongated hole in the strip insert, until the wall thickness of the strip insert has been traversed by the spring arms 58 and 59, and the secondary arms 518 and 519 press against an underside of the strip insert. Subsequently, the attachment clip is rotated so that the spring arms 58 and 59 engage behind an opposite side of the strip insert. This relative movement between the attachment clip and the elongated hole in the strip insert is indicated in FIG. 11 by the broken line indicating an elongated hole 523 which is rotated with respect to the elongated hole 522. The process of inserting and rotating the attachment clip into the elongated hole 522/523 can therefore be viewed as involving the attachment clip first being inserted into the elongated hole 522 after which the hole is rotated into the position shown by 523. In this latter position, the ends of the spring arms 58 and 59 project beyond the edge of the elongated hole 523, while the secondary arms 518 and 519 bear from the other side against the material of the strip insert around the elongated hole.

The position of the attachment clip in the elongated hole 523 is shown in FIG. 12. As can be seen, the strip insert 524 is clamped in from two sides, from one side by the main spring arms 58 and 59 and from the other side by the secondary arms 518 and 519. In this way, the attachment clip is reliably connected to the strip insert 524.

Together with the strip insert 524 and a collision strip 529 mounted thereon, the attachment clip can now be secured in the aperture 525 in the wall 526, by inserting the attachment clip together with the strip insert 524 through the aperture 525 with the curved part 54 leading. The bracing lugs 512 and 513 are pressed in, then spring back out again when they have been fitted (position shown in FIG. 12). So that the bracing lugs 512 and 513 have the greatest mobility, there is between them and the legs 52 and 53 a gap 527 and 528 to prevent bracing lugs 512 and 513 from becoming hooked either when they are being pressed into the legs 52 and 53 or when they spring back therefrom.

If the wall 526 is thicker than shown in FIG. 12, then the pressure surfaces 516, 517 cannot open out as much as is shown in FIG. 12; they will be held by the edge of the wall 526 in a further inwardly-bent condition. The attachment clip is thus automatically adapted to different sizes of parts which are to be attached; a greater thickness of the collision strip 29 having a similar effect.

In the position shown in FIG. 12, the attachment clip holds the collision strip 529 with the strip insert 524 on the wall 526 under the effect of the spring tension of the spring arms 58 and 59 in opposition to the pressure surfaces 516 and 517. The attachment clip, thus fitted under spring tension, guarantees rattle-free attachment of the collision strip 529 on the wall 526. It is also possible to remove the collision strip 529 from the wall 526, it is only necessary to push the bracing lugs 512 and 513 into the legs 52 and 53 by means of a pair of pliers, so that the eye 51 can be pulled back through the aperture 525.

When they are installed (see FIG. 12), the legs 52 and 53 completely fill the aperture 525 in the wall 526, so that the eye 51 is for practical purposes immovable in the aperture 525.

So that, when the attachment clip is rotated into the position shown in FIG. 11 with respect to the elongated hole 523, a definite limit position can be created, abutment members 530 and 531 are provided alongside the spring arms 58 and 59, diagonally opposite from each other. The abutment members 530 and 531, in the fitted condition of the attachment clip, limit its rotation in the elongated hole 522, 523, so that the legs 52 and 53 of the clip lie finally parallel with the respective edges of the elongated hole.

I claim:

1. A spring clip adapted to secure a strip to a wall by engaging flanges on the strip and projecting through an aperture in the wall, the clip comprising
   a curved part,
   a pair of parallel legs extending from said curved part, said legs being spaced apart approximately by the width of the aperture in the wall,
   a bent portion at the end of each leg opposite from said curved part, said bent portions extending in toward each other such that they almost touch,
   a spring arm extending out from each of said bent portions, said arms extending away from each other and being resiliently formed back toward said curved part,
   a resilient bracing lug extending out from each of said legs toward said spring arms and biased away from said legs, and
   a curved pressure surface at the end of each bracing lug curved in and back away from the spring arms for holding the wall and the flange on the strip between said pressure surfaces and said spring arms, the curved pressure surfaces preventing damage to the wall.

2. A spring clip as claimed in claim 1 wherein
   said bracing lugs are stamped from the respective legs, and
   a gap is stamped from each leg around said bracing lugs to prevent said lugs from catching on the legs.

3. A spring clip adapted to secure a strip to a wall by engaging flanges on the strip and projecting through an aperture in the wall, the clip comprising
   a U-shaped eye having two spaced parallel legs and a curved part joining the two legs,
   a bracing lug extending out from each of the legs of said eye, said bracing lugs being resiliently biased outward so that they can be deflected inward as the eye is inserted through the aperture but will spring back after insertion to abut the wall,
   first arms integral with each leg of the eye, said arms almost touching so as to oppose flattening of said eye and then diverging outward and apart for gripping the flanges on the strip to hold the flanges and the wall between said arms and said bracing lugs,
   secondary arms stamped from the sides of said first arms and resiliently bent out and away from said eye to grip the flanges of the strip between said first and secondary arms, and
   abutment lugs stamped from and bent back from said first arms on the sides thereof opposite from said secondary arms, said abutment lugs being bent back toward said eye to oppose rotation of the clip in the aperture.

4. A spring clip as claimed in claim 3 wherein the opposite edges of said first arms are cut obliquely so that the clip is adapted to be installed into an elongated hole in a strip by insertion of the flanges into the hole and rotation of the clip so that said first and secondary arms grip the flanges.

* * * * *